E. J. WILL.
TWINE DIPPER FOR ATTACHMENT TO SELF BINDING HARVESTERS.
APPLICATION FILED JAN. 7, 1916.
1,203,294.
Patented Oct. 31, 1916.
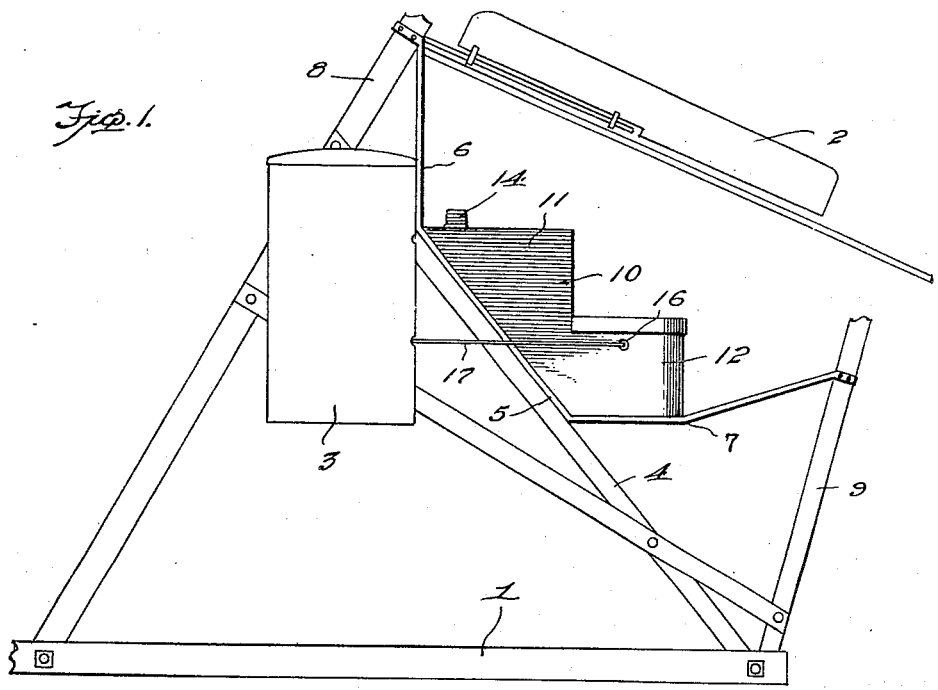
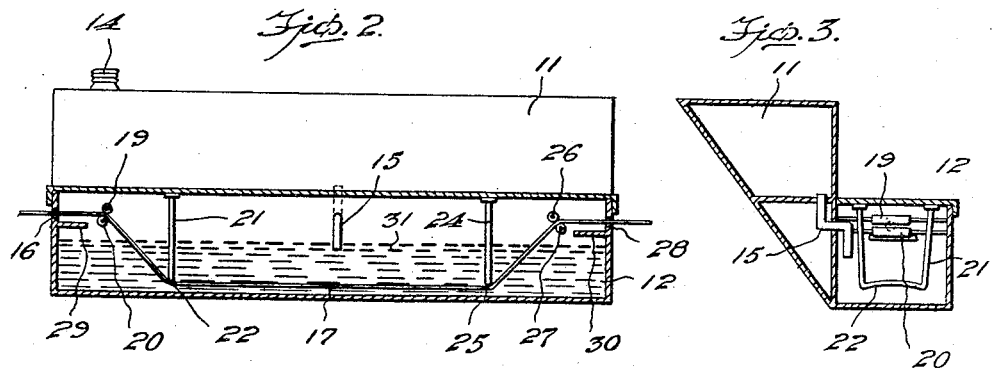
Witnesses
Inventor
E. J. Will.
By
Attorney

UNITED STATES PATENT OFFICE.

EMIL J. WILL, OF DELMONT, SOUTH DAKOTA.

TWINE-DIPPER FOR ATTACHMENT TO SELF-BINDING HARVESTERS.

1,203,294. Specification of Letters Patent. Patented Oct. 31, 1916.

Application filed January 7, 1916. Serial No. 70,835.

*To all whom it may concern:*

Be it known that I, EMIL J. WILL, a citizen of the United States, residing at Delmont, in the county of Douglas and State of South Dakota, have invented certain new and useful Improvements in Twine-Dippers for Attachment to Self-Binding Harvesters; and I do hereby declare the following to be a full, clear, and exact description of the invention, such as will enable others skilled in the art to which it appertains to make and use the same.

This invention relates to a twine dipping attachment for ordinary self binding harvesters, and the primary object of the invention is to provide a device for receiving any suitable type of liquid, through which the twine is passed on its travel from the twine box of an ordinary binder to the needle and knotter of the binder.

Another object of this invention is to provide a liquid receiving tank having suitable braces connected thereto for attaching the same to a part of the supporting structure of an ordinary self-binding harvester, which tank includes twine guiding rollers and rods for properly guiding the twine during its travel through the tank and the liquid and also to provide baffle plates for preventing the liquid from splashing out of the tank through the openings through which the twine passes in the ends of the tank.

With the foregoing and other objects in view this invention consists in such novel features of construction, combination and arrangement of parts as will be hereinafter more fully described, illustrated in the accompanying drawings and claimed.

In describing the invention in detail, reference will be had to the accompanying drawing wherein like characters designate like or corresponding parts throughout the several views, and in which:—

Figure 1 is an end view of the improved twine dipping attachment showing the same applied to a fragment of an ordinary self binding harvester. Fig. 2 is a longitudinal section through the dipping tank, and Fig. 3 is a cross section through the tank.

Referring more particularly to the drawings, 1 designates a part of the structure of an ordinary self-binding harvester, which has the ordinary type of deck 2 and twine box 3 attached thereto. The supporting structure 1 has an angle brace 4 secured thereto, upon which brace a portion of the supporting bar 5 of the dipping attachment rests. The supporting bar 5 has a portion thereof angled to rest in facial abutment with a portion of the upper surface of the cross brace 4, and its ends are bent as is shown at 6 and 7, for connection to braces 8 and 9 of the frame 1 for securely holding the attaching bar 5 to the binder structure.

The dipping tank generically indicated by the numeral 10 is attached to the supporting strip 5 in any suitable manner, and it comprises an upper tank 11 and a lower tank 12. The upper tank 11 has a filler opening 14, which is normally closed by a screw cap. A pipe 15 communicates with the tank 11 and with a tank 12 for feeding the liquid from the tank 11 into the tank 12.

The tank 12 has an opening 16 formed in one end of the same, through which the twine indicated at 17 enters the tank from the twine box 3 in the binder. Rollers 19 and 20 are positioned within the tank 12 and are spaced slightly from each other, for guiding the twine into the tank. A hanger structure 21 is positioned within the tank 12 and it is substantially U-shaped in cross section, having its bight portion 22 slightly curved upwardly, for receiving the twine after travel through or between the rollers 19 and 20 and guiding it adjacent to the bottom of the tank 12. A second hanger structure 24 is provided which is identical in construction with the hanger structure 21 and is positioned adjacent to the delivery end of the tank 12. The bight portion 25 of the hanger structure 24 is positioned in alinement with the bight 22, so that the twine 17 will travel in a straight line from one hanger to the other. A pair of rollers 26 and 27 are positioned within the tank 12 between the delivery end of the tank and the hanger 24, and the twine after passing over the bight portion 25 passes upwardly to and between the rollers 26 and 27, from whence it passes outwardly through the outlet opening 28 in the delivery end of the tank 12, to the needle of the binding structure of the binder (not shown).

Horizontally positioned baffle plates 29 and 30 are positioned within the tank 12 and extend inwardly from the inner surfaces of the ends of the tank, a short distance below the openings 16 and 28. The plates 29 and 30 are provided for preventing the liquid as indicated at 31 from splashing or passing outwardly through the openings 16 and 28 during the travel of the twine 17 through the tank.

The twine as it is used by the binder, passes out of the twine box 3 through the opening 16, between the rollers 19 and 20 from whence it passes downwardly beneath the bight portion 22 of the hanger structure 21, and across to the bight portion 25, from whence it passes upwardly out of the liquid 31 to and between the rollers 26 and 27. The twine passes from the rollers 26 and 27 to and through the opening 28 and to the needle of the ordinary twine structure of any ordinary binder. Any suitable liquid may be used in the tank 12 which will have the desired result of preserving the twine, and preventing the destroying of the twine by crickets, field mice of the like.

In reducing the invention to practice, certain minor features of construction, combination and arrangement of parts may necessitate alterations to which the patentee is entitled provided such alterations are comprehended within the scope of what is claimed.

What is claimed is:—

The combination with a self-binding harvester including a supporting frame, a twine box, and a binding structure, of a liquid retaining tank carried by said supporting structure and positioned between the twine box and the tying structure whereby the twine will travel through the liquid retaining tank upon passing from the twine box to the tying structure, means positioned within said tank for guiding the travel of the twine while passing therethrough, said tank adapted for retaining any suitable liquid for coating the twine, and baffle plates extending inwardly from the end of said tank for preventing the liquid from splashing out of the tank during the passage of the twine therethrough, a second tank positioned to one side of and above said first named tank, said second named tank being provided with a filling opening, and a pipe extending from said uppermost tank to the lowermost tank for feeding the liquid from the upper tank to the lower tank.

In testimony whereof I affix my signature in presence of two witnesses.

EMIL J. WILL.

Witnesses:
L. E. HOULTON,
A. M. SHAW.